Patented Feb. 24, 1925.

1,527,199

UNITED STATES PATENT OFFICE.

YONG K. LEE, OF CHICAGO, ILLINOIS, ASSIGNOR TO THE BORROMITE COMPANY OF AMERICA, OF CHICAGO, ILLINOIS, A CORPORATION OF ILLINOIS.

BASE-EXCHANGE SILICATE AND PROCESS OF PREPARING SAME.

No Drawing.   Application filed October 8, 1920. Serial No. 415,525.

*To all whom it may concern:*

Be it known that I, YONG K. LEE, a citizen of Korea, residing at Chicago, in the county of Cook and State of Illinois, have invented certain new and useful Improvements in Base-Exchange Silicates and Processes of Preparing the Same, of which the following is a specification.

This invention relates to an improved process of preparing base exchange silicates from glauconite, commonly called green sand. This green sand is mined near Birmingham, Burlington County, New Jersey, and other places, and may be refined by a process consisting of washing and screening the crude product until approximately 50 per cent of the original weight remains, this 50 per cent consisting of particles that pass through a 20 mesh screen and are retained on an 80 mesh screen. Wherever hereafter I use the phrase "green sand" I wish to be understood as referring to this partially refined article or any material of equivalent physical and chemical characteristics. A product now in wide and successful use for water purification is prepared from green sand by baking it, but this product under certain conditions of use fails to deliver an absolutely colorless water probably because of a failure to resist the erosive action of the water.

The object of my invention is to overcome this lack of resistance and to provide a material of increased base exchanging capacity, that is, a material, a unit weight of which, will soften a greater quantity of a given water than will the product of the general class now known.

I have discovered that I can accomplish these results by agitating the green sand with a solution of aluminum sulphate and sodium silicate prior to the baking process.

In carrying out my improved process I may proceed by way of example as follows: To one ton of green sand I add four gallons of a 10° Baumé solution of aluminum sulphate and agitate for five minutes. I then wash off the solution until the wash water is clear, after which I add forty gallons of 10° Baumé sodium silicate solution and agitate for an additional five minutes. The sodium silicate solution is then drained off and the material again washed until the wash water is neutral. The material is then gradually heated in rotary ovens to the baking temperature of 500° C. after which it is allowed to cool and is then screened to select particles which pass through a 20 mesh screen and are retained on a 60 mesh screen.

The resulting product is distinguished from the untreated green sand by its greater luster, brown color, increased hardness, increased stability against water erosion, and increased capability of regeneration by treatment with salt solution.

It is distinguished from the product made by merely baking the green sand by its greater hardness and luster, its increased base exchange capacity, and its freedom from the tendency to "bleed" or to color the water treated.

The effect of a treatment with sodium silicate and aluminum sulfate is to precipitate a coating or film upon the glauconite particles so that the base exchange capacity of the glauconite particles is increased.

I claim:

1. The process of preparing a base exchange silicate which comprises treating glauconite with aluminum sulphate and sodium silicate in the proportion of about one ton of glauconite to about four gallons of substantially 10° Baumé aluminum sulphate to about forty gallons substantially 10° Baumé sodium silicate and baking the thus treated product.

2. The process of preparing a base exchange silicate which comprises subjecting green-sand to treatment with a substantially 10° Baumé solution of aluminum sulphate and a substantially 10° Baumé solution of sodium silicate and baking the thus treated product.

3. The process of preparing a base exchange silicate which comprises subjecting green-sand to successive treatments with a solution of aluminum sulphate and a solution of sodium silicate and baking the thus treated product.

4. The process of preparing a base exchange silicate which comprises subjecting glauconite to treatment with aluminum sulphate and sodium silicate in the proportion of about one ton of glauconite to about four gallons of substantially 10° Baumé aluminum sulphate to about forty gallons substantially 10° Baumé sodium silicate and baking the thus treated product at a temperature of substantially 500° C.

5. The process of preparing a base exchange silicate which comprises subjecting glauconite to treatment with aluminum sulphate and sodium silicate in the proportion of about one ton of glauconite to about four gallons of substantially 10° Baumé aluminum sulphate to about forty gallons substantially 10° Baumé sodium silicate and agitating the material while undergoing said treatments, and baking the thus treated product at a temperature of substantially 500° C.

6. The process of preparing a base exchange silicate which comprises subjecting glauconite to treatment with aluminum sulphate and sodium silicate in the proportion of about one ton of glauconite to about four gallons of substantially 10° Baumé aluminum sulphate agitating said mixture for about five minutes, then washing said mixture, and then adding about forty gallons substantially 10° Baumé sodium silicate, agitating said mixture for about five minutes, then washing said mixture, and then baking said mixture at a temperature of substantially 500° C.

7. The process of preparing a base exchange silicate, which comprises forming a coating upon green sand from sodium silicate and aluminum sulphate and baking, which coating will increase base exchange capacity of green sand particles.

8. The process of preparing a base exchange silicate, which comprises forming a coating upon carrier particles having base exchange capacity, from sodium silicate and aluminum sulphate and baking, which coating will increase base exchange capacity of such particles.

In testimony whereof I have hereunto subscribed my name in the presence of two subscribing witnesses.

YONG K. LEE.

Witnesses:
C. S. BUTLER,
F. M. WARDEN.